United States Patent [19]

Schuh

[11] Patent Number: 4,520,590

[45] Date of Patent: Jun. 4, 1985

[54] TREE BRACE SYSTEM

[76] Inventor: Gerald J. Schuh, 3670 Gina Pl., Las Vegas, Nev. 89103

[21] Appl. No.: 484,433

[22] Filed: Apr. 13, 1983

[51] Int. Cl.³ .............................................. A01G 17/06
[52] U.S. Cl. .......................................... 47/43; 47/44; 47/47
[58] Field of Search .......................... 47/43, 42, 44, 47; 248/165

[56] References Cited

U.S. PATENT DOCUMENTS

| 379,948 | 3/1888 | Frantz | 47/23 |
| 572,133 | 12/1896 | Stephens | 47/23 |
| 2,815,801 | 12/1957 | Fingerhut et al. | 248/165 |

Primary Examiner—Robert A. Hafer
Assistant Examiner—Bradley M. Lewis
Attorney, Agent, or Firm—Seiler, Quirk & Tratos

[57] ABSTRACT

A tree brace unit for maintaining young trees in an upright posture has a circular ground-mounted base and a plurality of legs extending upwardly therefrom to a collar which encircles the tree trunk at an elevated level. The brace portion is formed from a pair of identical members formed from a single piece of metal rod. Each piece is bent to form a pair of parallel legs which are connected by a collar segment. When mounted in opposing position on the base, the two collar segments are clamped together to form a collar which extends completely around the tree trunk.

12 Claims, 6 Drawing Figures

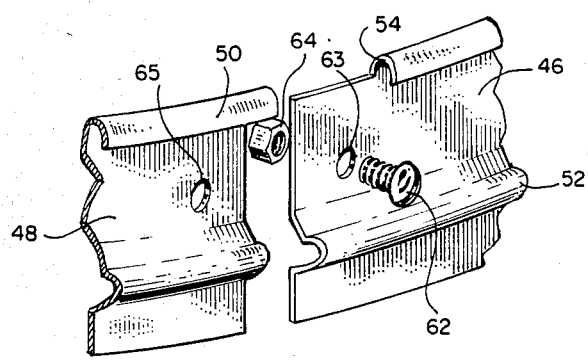
FIGURE 3.
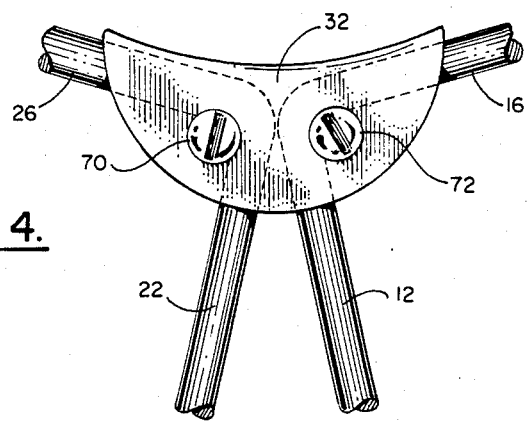
FIGURE 4.
FIGURE 5.
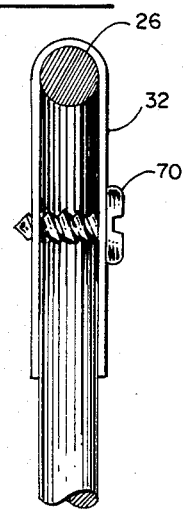 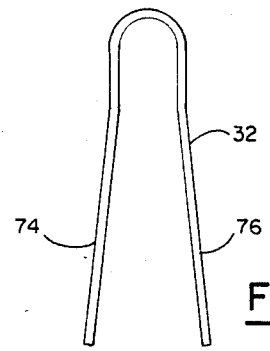
FIGURE 6.

TREE BRACE SYSTEM

BACKGROUND OF THE INVENTION

This invention relates to a brace system for maintaining the trunk of a young tree in a substantially vertical position. More particularly, it relates to a self contained unit having an annular collar which fits an upper portion of a tree trunk, and has a plurality of metal legs extending downwardly therefrom which attach to a circular base which is fastened to the ground.

It is well known that young trees frequently do not have sufficient trunk strength to maintain an upright position, particularly when the wind blows. Young trees grow upwardly quite quickly, and develop substantial foliage, but do not develop sufficient trunk thickness and strength to prevent the tree from bending or blowing over. As a result, a number of guying systems have been developed to brace the tree trunk to maintain it in a vertical position. The most common guying system consists of several stakes which are placed at a distance from the trunk around the periphery of the tree and are pounded into the ground, with a series of ropes or wires extending from the stakes to tree limbs or around the tree trunk. This type of system has created difficulties, first because the wires are often invisible and may cause injury to children or animals, and secondly because the wires or ropes are abrasive to the tree bark during the natural movement of the tree and cause damage to the tree surface. Accordingly, most of the developments in guying systems have been directed to some sort of improvement in the collar portion which actually contacts the tree. For example, Cartwright, U.S. Pat. No. 720,667 discloses a series of concentric collars fastened around the tree which attach to a vertical stake driven into the ground along side the trunk. Lichtenthaler, U.S. Pat. No. 3,226,822, discloses a method of attachment of a tree trunk to a vertical stake with a strip of resilient material. Lucia, U.S. Pat. No. 4,073,090 discloses a particular collar for use with guy wires which will disengage from the tree after a predetermined expansion of the tree trunk. German Pat. No. 2,407,496 discloses a plurality of rigid legs which are set in concrete which attach to a collar mechanism and prevenl the tree from moving from side to side. Heinecke, U.S. Pat. No. 3,803,759, discloses a plant support which consists of a bottom pan having a central opening and three upwardly converging legs which provide supports to which a growing plant may be tied as its vertical growth increases.

A number of patents also disclose devices which surround the lower portion of tha trunk of a growing tree in order to protect it from damage caused by lawn mowers, animals, insects, and the like. Some of these devices may also provide a water retaining portion at ground level to ensure adequate water supply to the tree. Examples of these patents include Clines, U.S. Pat. No. 514,306, Rowe et al., U.S. Pat. No. 369,616, Daniels, U.S. Pat. No. 2,978,837, and Scharf, U.S. Pat. No. 4,268,992. In general, the devices disclosed in these patents are designed to simply protect the bottom portion of the tree from injury, but do not provide any support to maintain the tree trunk in a vertical position.

The brace of the invention is easily made from a few pieces of inexpensive metal, and is reusable. It consists of an annular sleeve or base portion fabricated from two mated semicircular parts and two upwardly extending brace portions. Each brace portion comprises a single piece of metal rod which is bent to form a pair of substantially parallel legs having a half loop portion extending outwardly and perpendicularly from the legs. Two opposing brace members are fastened together with a pair of clips, with the two half loop portions forming an entire loop or collar which extends around the trunk of the tree. The circular base is anchored into the ground but preferably extends slightly above ground level, thereby retaining moisture and mulch. The support rods or legs are sufficiently strong to maintain the trunk in a vertical position, yet are sufficiently flexible to permit a certain amount of trunk movement which is beneficial to the tree. A simple rubber guard which extends around the loop or collar portion at the top of the brace protects the trunk from damage caused by contact with the collar.

Accordingly, it is an object of the present invention to provide a tree brace for young trees which is self-contained, easy and inexpensive to fabricate, and which is reusable. It is a further object of the invention to provided such a tree brace having a base portion which can hold water and mulch material to assist the growth of the tree. It is yet a further object of the invention to provide such a brace having a collar portion which is nonabrasive and will not damage the tree trunk. These and other objects of the invention will be apparent from the following description of a preferred embodiment thereof.

SUMMARY OF THE INVENTION

A tree brace unit comprises a base portion having a continuous vertical wall adapted to be ground mounted annularly to a tree trunk and brace means which consists of several leg members having one end thereof removably fastened to the base portion. A collar is formed at an upper portion of the legs and is adapted to extend entirely around the periphery of the tree trunk. The brace means and the collar are preferably formed from a pair of substantially identical, opposing brace members, each of which consists of a pair of elongate parallel legs which are connected at their upper ends by a loop portion which extends at approximately right angles from the legs. The two looped portions, when retained in opposing position by a pair of clamps, form the collar. Each brace member is preferably fabricated from a single piece of wire which is bent to form the legs and the loop.

BREIF DESCRIPTION OF THE DRAWINGS

The invention is best understood with reference to the drawings, in which:

FIG. 3 is a partial view of the base unit showing the mechanism of fastening the two base unit sections;

FIG. 4 is a partial side view of the clamp method of attachment of the two opposing brace members;

FIG. 5 is a partial side view, partially in section, of the clamp in place around the brace member; and FIG. 6 is a side view of a clamp.

DETAILED DESCRIPTION OF A PREFERRED EMBODIMENT

Figure 1:
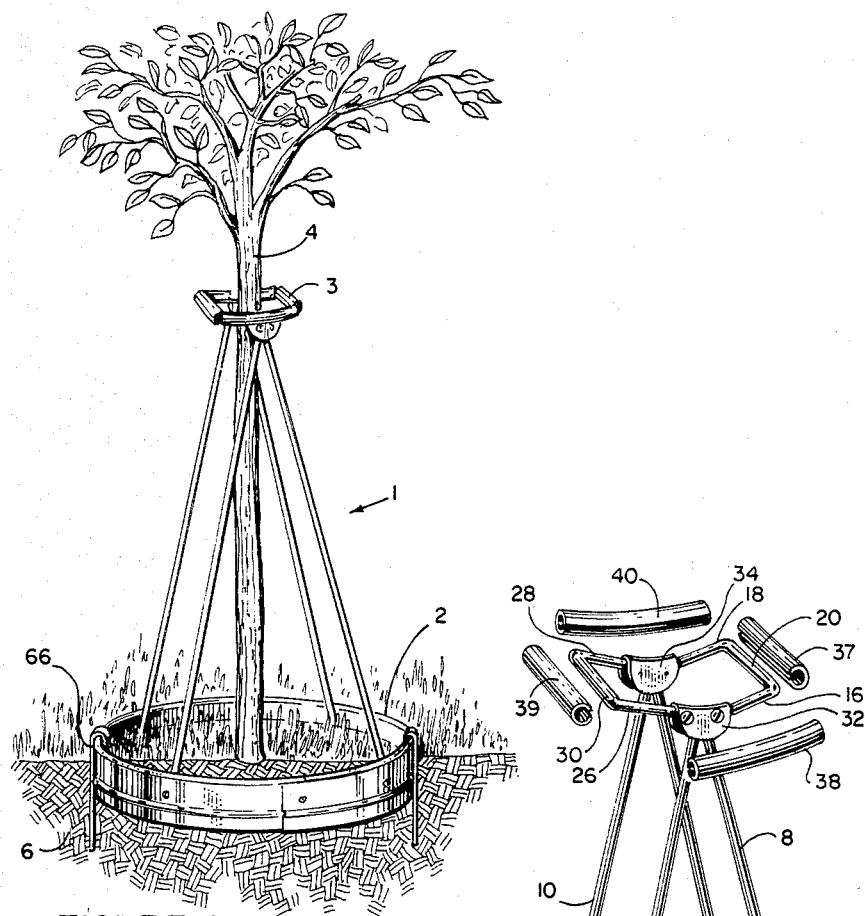
FIG. 1 is a perspective view of a tree brace of the invention shown in place around a young tree
Figure 2:
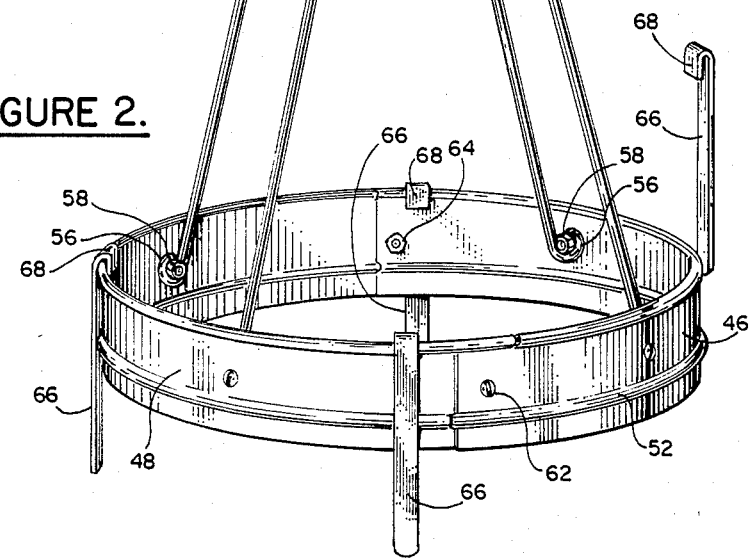
FIG. 2 is a perspective view of a brace unit of the invention, with the collar protectors exploded.

Referring first to FIG. 1, brace unit 1 of the invention consists of a ground-mounted base portion 2 and a collar portion 3 which is supported at an upper portion of the trunk of tree 4 by its plurality of generally rigid metal legs. The base consists of an annular ring which is a flat, vertical wall which extends continuously around the base of the tree and is spaced therefrom. Details of construction of the base are shown in FIGS. 2 and 3. The ring is driven into the ground 6 with the upper portion of the ring extending slightly above the surface of the ground to retain water and mulch.

The legs and the collar portion of the brace unit are fabricated from a pair of brace members 8 and 10. Each brace member is fabricated from a single piece of 5/16 inch diameter steel rod which is bent to form a pair of elongate legs and an upper collar segment. Brace member 8 forms legs 12 and 14, and collar segments 16, 18, and 20. As shown in FIGS. 1 and 2, the collar is generally rectangular in shape, although any other shape such as oval or circular can conveniently be used. An important feature of the collar is that it is dimensioned to provide substantial space between the collar and the trunk, permitting movement of the trunk inside the collar. This allows movement of the trunk, which strengthens the tree. The collar width is preferably at least twice the trunk diameter.

As shown, the rectangular collar segment formed from sections 16, 18, and 20 is formed by making four right-angle bends in the central portion of the steel rod. Accordingly, the collar segment is formed by a planar angular extension of the rod at the uppermost portion of the two legs, and forms a loop which connects the ends of the two legs. The plane of the collar segment intersects the plane extending through both legs at an angle of about 70°–110°, preferably about 90°.

Brace member 10 is identical to member 8 and is arranged in the unit in opposing juxtaposition. Brace segment 10 consists of elongate parallel legs 22 and 24, having a collar segment at the uppermost portion of the legs formed by rod sections 26, 28, and 30. The two opposing brace members are fastened into place by a pair of clips or clamps 32 and 34. These clamps are shown in more detail in FIGS. 4, 5, and 6. Accordingly, the collar 3 is formed from rod sections 16, 18, and 20 of brace member 8, and rod sections 26, 28, and 30 of brace member 10. The bark of the tree trunk is protected from abrasion from contact with the collar by four pieces of flexible rubber tubing 37, 38, 39, and 40, which surround the tubing sections and serve as a protective guard to prevent abrasion to the bark. The tubing sections are longitudinally slit for easy attachment to the brace member; the tubing is simply opened by hand, slid in place over the dowel rod, and fastened in place by the natural bias of the tubing to retain its round cross-sectional configuration.

The brace member legs are fastened to the annular base by loops 56 at the end of each leg which are attached by nut/bolt combinations 58 to the wall of the base. The base itself is formed from two semicircular base sections 46 and 48 which are mated and fastened together to form a continuous wall member. Each base section is formed from a length of sheet metal which is bent to semicircular shape and which has a turned upper rim portion 50 to provide strength at the upper edge of the wall and to prevent injury or damage from a sharp edge. The turned rim also assists in mating the two sections as shown in FIG. 3. An outwardly extending bead 52 also provides structural rigidity to the wall and assists in mating the two semicircular sections 46 and 48. As shown in FIG. 3, a portion of one end of the rim of each semicircular section is cut away at 54 to enable the two rims to be slidably engaged as shown in FIG. 2. The two sections are shown in exploded view in FIG. 3. When the two sections are slidably engaged, they are attached with bolt 62 and nut 64.

FIGS. 4–6 show the method of attachment of the two opposing brace members at the collar. A side view of the clamp 32 is shown in FIG. 6. The clamp consists of a flat piece of sheet metal that has been bent into a "U" configuration, with two leg portions of the clip 74 and 76 being slightly divergent. When the two opposing brace members are placed together as shown in FIG. 4, with the right angle bends of the rods adjacent, the clamp 32 is placed over the two adjacent brace members sections as shown in FIG. 4. Two machine screws 70 and 72 are placed through threaded openings on either side of the clamp as shown in FIG. 5, thereby drawing the two divergent leg portions of the clamp together in parallel position as shown in FIG. 5. The shafts of the screws thereby prevent the two angled rod members from pulling apart from each other. The rubber protector guards can then be placed over the clamp as shown in FIG. 1.

The brace units of the invention can be easily mounted in place after the tree has been planted. First, the two semicircular sections are placed on either side of the trunk, and the two units are mated as shown in FIG. 2 and fastened with nuts and bolts 62 and 64 which extend through aligned holes 63 and 65 of the section walls. Then, the two brace members can be mounted into place by fastening the lower ends of each leg 56 to the annular base ring with the nut/bolt combinations 58. Next, the two clips 32 and 34 are mounted over the upper portions of each brace member, and are fastened in place with the machine screws as shown in FIG. 2. The rubber guard tubing sections 37 through 40 can then be mounted in place. The base ring is fastened to the ground by driving a plurality of metal stakes 66 into the ground adjacent the ring, and attaching the hooked end portion 68 of each stake over the rim of the base ring. The stakes are then continued to be hammered into the ground, thus driving the bottom edge of the ring wall into the ground annularly to the trunk. The ring is typically about four inches high, and is driven into the ground preferably to a level such that about one inch of the rim remains above ground level. This protects the trunk against impact by lawn mowers and the like, and also leaves a retaining portion for mulch and water. If desired, the rim can be driven completely into the ground. The stakes fasten the ring into the ground, thereby providing a very stable, solid foundation for the brace unit.

The brace unit may be reused in whole or in part as desired. When a tree has grown to a size such the external support for the trunk is no longer needed, the brace members may be easily removed by unscrewing the fastening members and by removing the legs from the base unit. The annular ring may be removed or left in place permanently. If desired, a wire shield or screen may be easily mounted in place around the legs extending from the collar to the base to prevent rodents and other animals damage to the trunks of the trees. In addition, this structure may be used to mount plastic film shield or burlap wrapping for protection against cold and frost.

While the invention has been described with respect to a preferred embodiment thereof, the foregoing description should be considered as illustrative rather than limiting. For example the particular shape of the annular rim and of the collar may be modified to any desirable shape. In addition, the angle of the collar extension at the top of the legs can be varied from right angles to provide a satisfactory retaining mechanism. Furthermore, the particular type of abrasion protection used to surround the collar dowel may be varied. These and other modifications are well within the scope of the state of the art. Accordingly, the invention should not be considered limited by the description thereof, rather by the following claims.

I claim:

1. A tree brace unit comprises:
   a base member adapted to be ground-mounted spaced from the tree,
   brace means for maintaining the tree in a substantially upright position comprising a pair of substantially identical opposing brace members, each brace member formed from a one piece metal rod, and each member having a pair of upwardly extending, substantially parallel legs, each leg having a lower end thereof attached to the base member, said legs being connected at upper portion thereof by a collar forming segment and
   a collar formed by opposing upper collar forming segments of the brace members adapted to extend around the periphery of the tree located at an upper portion of the legs.

2. The unit of claim 1 wherein each brace member comprises a one-piece metal rod formed to include a pair of substantially parallel legs of equal length.

3. The unit of claim 2 wherein the legs are connected at an upper porrion thereof by a loop portion of the rod which extends outwardly at an angle from the legs.

4. The unit of claim 2 wherein the legs are connected by a rod segment which extends outwardly in a plane which intersects a plane extending through both legs at an angle of from about 70° to about 110°.

5. The unit of claim 4 wherein the planes intersect at about 90°.

6. The unit of claim 1 wherein each opposing brace member comprises a pair of legs and a collar portion, and wherein the collar portions are attachable to form a collar extending entirely around the periphery of the tree.

7. The unit of claim 6 also comprising fastening means to attach the collar portions.

8. The unit of claim 7 wherein the fastening means comprises a pair of clamps which extend over the opposing collar portions adjacent the intersections of the legs with the collar portions.

9. The unit of claim 1 also comprising removable protective guard means atrachable to the collar to prevent abrasion of the tree by the collar.

10. The unit of claim 6 also comprising removable protective guard means atachable to the collar to prevent abrasion of the tree by the collar.

11. The unit of claim 1 wherein the base comprises a pair of semi-circular ring members.

12. The unit of claim 1 also comprising a plurality of ground-mountable stakes having fastening means at an upper end thereof for maintaining the base in the ground.

* * * * *